United States Patent
Grasso et al.

(10) Patent No.: US 6,191,854 B1
(45) Date of Patent: Feb. 20, 2001

(54) OPTICAL TELECOMMUNICATIONS SYSTEM

(75) Inventors: Giorgio Grasso, Monza; Aldo Righetti, Milan, both of (IT); Paolo Ottolenghi, Sceaux (FR); Fabio Donati, Milan (IT)

(73) Assignee: Pirelli Cavi e Sistemi S.p.A., Milan (IT)

( * ) Notice: Under 35 U.S.C. 154(b), the term of this patent shall be extended for 0 days.

(21) Appl. No.: 09/102,759

(22) Filed: Jun. 23, 1998

Related U.S. Application Data

(60) Provisional application No. 60/052,079, filed on Jul. 15, 1997.

(30) Foreign Application Priority Data

Jun. 23, 1997 (IT) .............................................. MI97A1483

(51) Int. Cl.⁷ ....................................................... H01S 3/00

(52) U.S. Cl. .......................................... 356/341; 359/161

(58) Field of Search ..................................... 359/341, 161

(56) References Cited

U.S. PATENT DOCUMENTS

| | | |
|---|---|---|
| 4,560,246 | 12/1985 | Cotter . |
| 4,715,679 | 12/1987 | Bhagavatula . |
| 4,755,022 | 7/1988 | Ohashi et al. . |
| 4,822,399 | 4/1989 | Kanamori et al. . |
| 4,953,939 | 9/1990 | Epworth . |
| 5,267,073 | 11/1993 | Tamburello et al. . |
| 5,343,322 | 8/1994 | Pirio et al. . |
| 5,355,240 | 10/1994 | Prigent et al. . |
| 5,361,319 | 11/1994 | Antos et al. . |

(List continued on next page.)

FOREIGN PATENT DOCUMENTS 0 677 902 A1  10/1995 (EP) .

OTHER PUBLICATIONS

Japanese Patent Abstract No. 0 232 0770, Shirasaki Masataka, Optical Transmission Method and its System, Publication No. 04191709, Publication Date Oct. 7, 1992.

Ouellette; "Dispersion Cancellation Using Linearly Chirped Bragg Grating Filters in Optical Waveguides", Optics Letters, vol. 12, No. 10, Oct. 1987, pp. 847–849.

ITU–T Recommendation G. 653 of Mar., 1993, "Characteristics of a Dispersion–Shifted Single–Mod Optical Fibre Cable" pp. 1–5.

Guild et al.; "Unrepeatered Transmission Over 415km at 2.5 GBIT/S With Raman Gain and +26.5 DBM Launch Power", Electronics Letters, vol. 32, No. 22, Oct. 24, 1996, pp. 2087–2088.

Hansen et al.; "529km Unrepeatered Transmission at 2.488 GBIT/S Using Dispersion Compensation, Forward Error Correction, and Remote Post–and Pre–Amplifiers Pumped by Diode–Pumped Raman Lasers", Electronics Letters, vol. 31, No. 17, Aug. 17, 1995, pp. 1460–1461.

Chaudhry et al.; "Unrepeatered Transmission at 2.5GBIT/S Over 410km With a Signle Remote Amplifier and Depersion Compenstion", Electronics Letters, vol. 30, No. 24, Nov. 24, 1994, pp. 2261–2063.

*Primary Examiner*—Mark Hellner
(74) *Attorney, Agent, or Firm*—Finnegan, Henderson, Farabow, Garrett & Dunner, L.L.P.

(57) ABSTRACT

Optical telecommunications system, comprising:
  a transmitting station capable of emitting an optical signal having a power of between 18 and 30 dBm;
  an optical fibre transmission line capable of transmitting the said optical signal, comprising dispersion shifted fibre with a length of between 100 km and 1000 km;
  an optical receiving station, capable of receiving the said optical signal;
which comprises, between the said transmission line and the said optical receiver, a chromatic dispersion compensator.

Figure 1A:
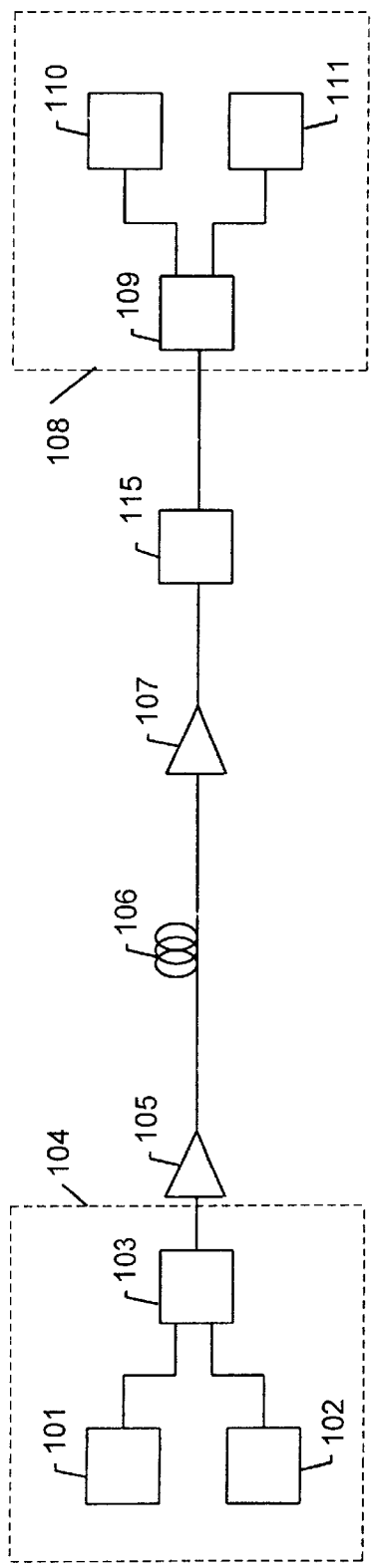

Preferably the said optical fibre transmission line has a length of between 200 and 400 km.

17 Claims, 4 Drawing Sheets

U.S. PATENT DOCUMENTS

| | | |
|---|---|---|
| 5,448,674 | 9/1995 | Vengsarkar et al. . |
| 5,748,364 | 5/1998 | Meli et al. . |
| 5,808,787 | 9/1998 | Meli et al. . |
| 5,886,804 * | 3/1999 | Onaka et al. ......................... 359/161 |
| 5,956,440 * | 9/1999 | Mikami et al. ......................... 385/24 |
| 5,966,228 * | 10/1999 | Akiba et al. ......................... 359/173 |
| 5,995,278 * | 11/1999 | Kikuchi et al. ...................... 359/341 |
| 6,005,702 * | 12/1999 | Suzuki et al. ......................... 359/183 |
| 6,021,235 * | 2/2000 | Yamamoto et al. .................... 385/24 |

\* cited by examiner

OPTICAL TELECOMMUNICATIONS SYSTEM

The application claims the benefit of U.S. Provisional Application No. 60/052,079, filed Jul. 15, 1997, and claims the right to priority based on Italian Patent Application No. MI97 A 001483, filed Jun. 23, 1997.

The present invention relates to an optical telecommunications system and a method for the transmission of optical signals.

The use of optical fibres for sending optical signals, carrying the information to be communicated over a distance, is known in the most recent telecommunications technology.

The optical signals sent along an optical fibre are subject to attenuation, so that it may be necessary to amplify the signal power level from the end of the line close to the transmitting station, by means of a power amplifier (booster).

A preamplifier is usually present at the end of the line close to the receiving station, to bring the power level of the signal into a range of values which is suitable for the receiving equipment.

There are known optical amplifiers based on the properties of a fluorescent dopant, for example erbium, which, if suitably excited by the application of pumping light energy, generates a high emission -in the wave band corresponding to the minimum attenuation of the silica optical fibres.

In-fibre optical amplifiers, for example erbium doped in-fibre amplifiers, are known, for example, from patent application EP 677.902.

To increase the length of the communication line, the use of optical line amplifiers, connected in predetermined positions along the line to periodically increase the power of the transmitted signals, is known.

The length of the optical fibre spans between the power amplifier and the preamplifier, in the case of communication lines without intermediate amplifiers, or the length of the fibre spans between successive line amplifiers, in the case of lines with line amplifiers, is limited by the available optical power at the input of the span.

The applicant has approached the problem of the transmission of signals in optical communication systems with medium or long spans, for example those with a length of between 100 and 1000 km, and preferably with a length of between 200 and 400 km. In particular, the applicant has approached the problem of the transmission of optical signals in communication systems comprising a single optical fibre span with a length of between 200 and 400 km.

It is known that an optical signal propagating along an optical fibre may give rise, in the case of high optical power density to stimulated Brillouin scattering (SBS). This phenomenon may constitute a source of noise which can obstruct or impede the correct reception of the signal at the end of the optical fibre.

It is also known, for example from U.S. Pat. No. 4,560,246(Cotter) and EP 565.035 (Hitachi), that the threshold optical power of the said phenomenon of stimulated Brillouin scattering in an optical fibre is increased in the case of widening, by phase modulation, of the frequency bands of the propagating optical signal.

The bandwidth values required to prevent SBS may be calculated, by a person skilled in the art, from the corresponding power values, for example on the basis of the information in the cited patents. If the bandwidth is not sufficient, this bandwidth may be increased by known methods.

The widening of the said frequency band is not necessary if the signal has a sufficiently wide band to prevent the occurrence of SBS, for example between 0.3 and 1.5 nm, and a power of less than 30 dBm (1 W).

In particular, the applicant has observed that signals of this type can be obtained by direct semiconductor laser modulation, for example with digital signals at 2.5 Gbit/s, and amplification of these, before they are sent to the fibre, to suitable powers. In this case the widening of the line is attributable to the phenomenon of "chirping" of the signal wavelength, related to the direct semiconductor laser modulation, which entails a variation of the signal wavelength during the pulses' emission, particularly at rising or falling edges in the case of a digital modulating signal.

It is known that the optical fibres used in communication lines have chromatic dispersion, due to the combination of the characteristics of the refractive index profile and of its constituent material, which varies with the wavelength of the transmitted signal and is cancelled at a certain value $\lambda_0$ of the wavelength.

This phenomenon of chromatic dispersion consists essentially in the fact that the different chromatic components of each pulse, each characterized by its own wavelength, travel in the fibre at different velocities.

Step index (SI) single-mode optical fibres are known. These fibres have a zero dispersion point in the spectral region around 1300 nm and have a positive dispersion per unit wavelength, of approximately 17–18 ps/(nm·km), for signals with wavelengths in the band between approximately 1530 nm and approximately 1560 nm.

Optical fibres with a shifted zero chromatic dispersion point, or DS (dispersion shifted) fibres, are known. The optical characteristics of DS fibres are designed so that they shift the zero chromatic dispersion point to a wavelength in the region between 1500 and 1600 nm, which is commonly used for telecommunications.

Fibres of this kind are defined in ITU-T Recommendation G.653 of March 1993, in which it is specified that the chromatic dispersion of the fibre is cancelled nominally at a wavelength $\lambda_0$ of 1550 nm, with a tolerance of 50 nm with respect to this value.

DS fibres are described, for example, in U.S. Pat. Nos. 4,715,679, 4,822,399, and 4,755,022 and are marketed by Corning (USA) under the trade name SMF/DS™ and by Fibre Ottiche Sud (Italy) under the trade name SM DS.

In the framework of the present application the terms "dispersion shifted fibre" will indicate, in general, a single-mode optical fibre having a relatively low dispersion in the third telecommunication window in comparison with standard SI fibres, i.e., a fibre having a zero dispersion wavelength $\lambda_0$ in the region between 1450 and 1650 nm.

It is known that high values of chromatic dispersion, for example in the case of intercontinental optical communication lines, with lengths of the order of many thousands of kilometers, must be suitably compensated to permit correct reception of the signals.

For example, in the presence of lines with positive dispersion, negative dispersion optical fibres of the type described in the patents U.S. Pat. No. 5,361,319 or U.S. Pat. No. 5,448,674 or in the patent application JP 1-295,207 may be used.

Other examples of dispersion compensators are optical fibre Bragg filters in with variable pitch (chirped), for example of the type described in the article by F. Ouellette published in Optics Letters, Vol. 12, No. 10, pp. 847–849, in October 1987, or in U.S. Pat. No. 4,953,939.

However, it is considered that compensation is not necessary in the presence of a chromatic dispersion of limited extent, for example of less than 1500 ps/nm, such as that which accumulates in SI fibre spans with a length of less than approximately 80 km, or in DS fibre spans with a length of up to 1000 km.

U.S. Pat. No. 5,355,240 (Prigent et al.) describes implementing an optical communication link when transmission of information over the link is subject to non-linear effects to the degree that correction of such effect is necessary. A link of this kind is typically a long-haul link such as an intercontinental link which can be from around 3000 to 10000 km long or even longer. The patent indicates that the described invention may be relevant for shorter links if they have a high mean optical power rating. Correction means for limiting the disadvantageous consequences of chromatic dispersion and/or non-linear effects comprise, at the output of the transmission line, a dispersion compensator adapted to apply dispersion in the opposite direction to and of lower absolute value than the line dispersion.

U.S. Pat. No. 5,343,322 (Pirio et al.) describes a system for very long distance transmission of digital signal by optical fibres, with dispersion compensation at reception. The transmitter and receiver stations are connected by a monomode optical fibre with negative chromatic dispersion at the operating wavelength of the system, having a length of at least one thousand kilometers. The receiver station comprises device to compensate for the distortions due to the non-linear effects and to the dispersion introduced by the transmission line. The patent indicates that the nonlinear effect is negligible in the usual field of operation of the optical systems, but becomes non-negligible for very high power values (of the order of 1 W) or for very large propagation distances at reasonable levels of power (some thousands of kilometers in a periodic amplification system). The cited patent also indicates that, in short-distance transmission, since the mean on-line optical power does not come into play in the computation of the compensation for the distortions, it may advantageously be increased in order to increase the signal-to-noise ratio and hence reduce the bit error rate (BER).

The applicant has observed that, contrary to what is disclosed in the prior art, signal distortion problems arise at powers of less than 1 W, for example even at powers of more than 18 dBm per channel, in medium-short optical lines, for example with lengths of less than 1000 km, but with a medium-long length of the spans, as indicated previously.

The applicant has found that these distortion problems may be substantially limited by compensating the signal dispersion in a portion of the communication system lying between the end of the span (preferably the output of the optical preamplifier) and the input of the optical receiving station. In particular, the applicant has found that the signal distortion can be limited by compensating the dispersion accumulated by the signals along the line with a dispersion of opposite sign to the accumulated dispersion and greater than it in absolute value.

In a first aspect, the present invention relates to an optical telecommunications system comprising:
 a transmitting station capable of emitting an optical signal having a power of between 18 and 30 dBm;
 an optical fibre transmission line capable of transmitting the said optical signal, comprising dispersion shifted fibre with a length of between 100 km and 1000 km;
 an optical receiving station, capable of receiving the said optical signal;
characterized in that it comprises, between the said transmission line and the said optical receiver, a chromatic dispersion compensator.

Preferably the said optical fibre transmission line has a length of between 200 and 400 km.

Preferably the said signal has a power of between 19 and 23 dBm.

Preferably the said signal has a bandwidth of between 0.3 and 1.5 nm; more preferably it is between 0.3 and 1.0 nm, and yet more preferably it is between 0.3 and 0.6 nm.

In one particular embodiment, the said transmitting station is capable of transmitting at least a second optical signal at a wavelength different from the wavelength of the said first signal, the said second signal having a power of between 18 and 30 dBm.

Preferably the said transmission line comprises an optical amplifier, for example an erbium-doped fibre amplifier. Preferably the said signal has a wavelength in the 1530–1560 nm band. Preferably the said transmitting station comprises a direct modulation laser source, and/or an optical power amplifier.

In a second aspect, the present invention relates to a method of transmitting optical signals, comprising the following stages:
 generating an optical signal having a power of between 18 and 30 dBm;
 transmitting the said optical signal along an optical fibre span with a length of between 100 and 1000 km, causing in the said signal a chromatic dispersion of less than 1500 ps/nm as a result of the said transmission in the said span;
 amplifying the said signal;
 receiving the said signal,
characterized in that it comprises the stage of compensating the said chromatic dispersion of the said signal.

Preferably the said stage of compensating the chromatic dispersion comprises applying to the said signal a chromatic dispersion of opposite value to, and greater in absolute value than, the said chromatic dispersion to which the said signal is subject.

Figure 1B:
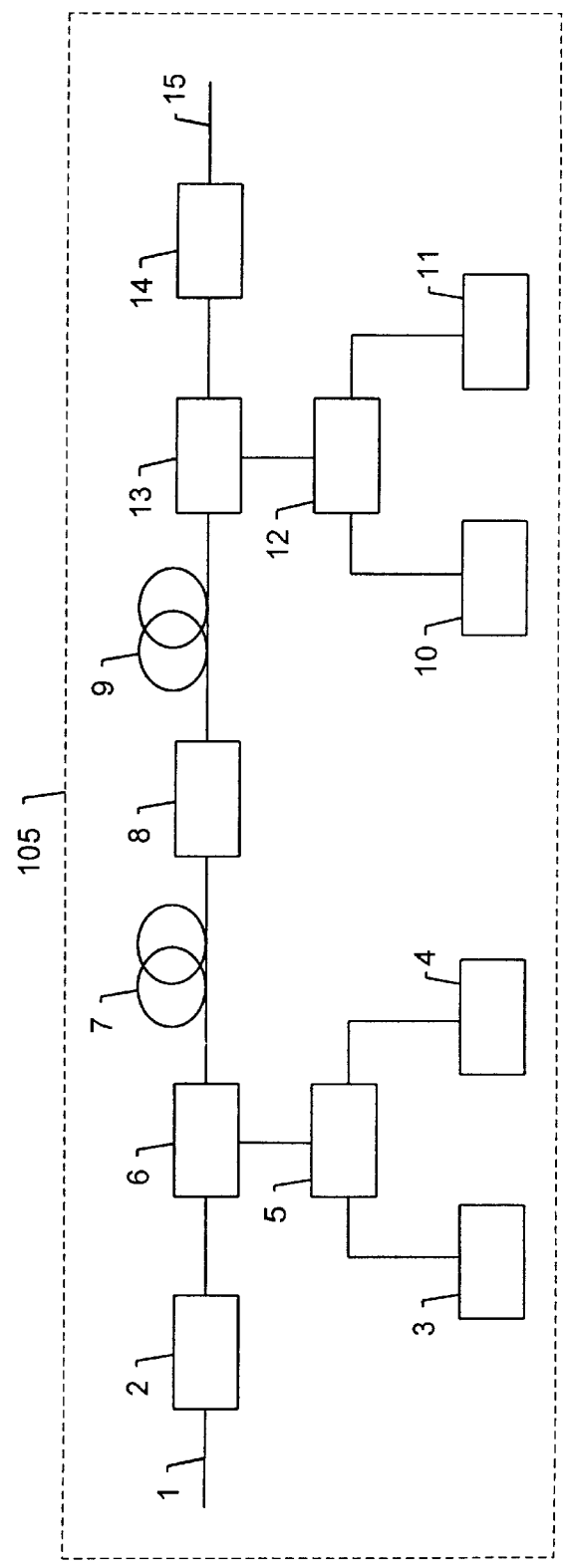
Figure 2:
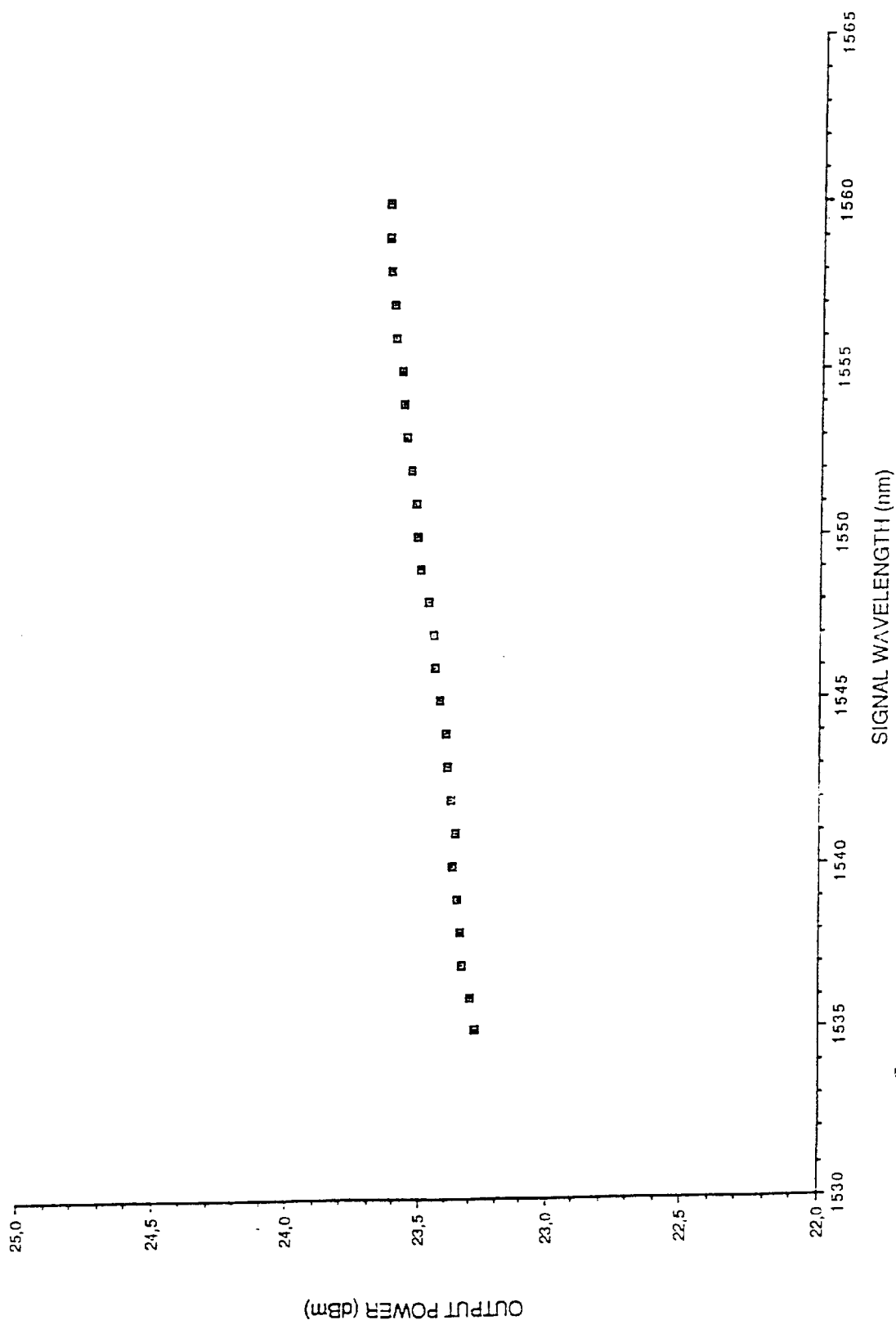
Figure 3:
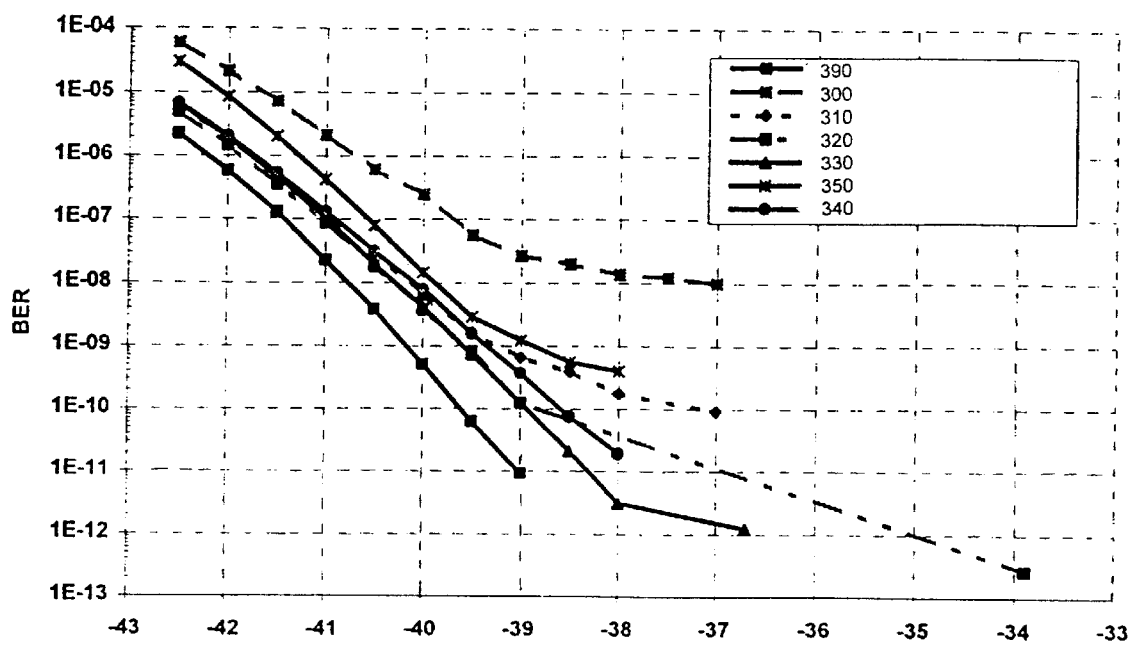
Figure 4:
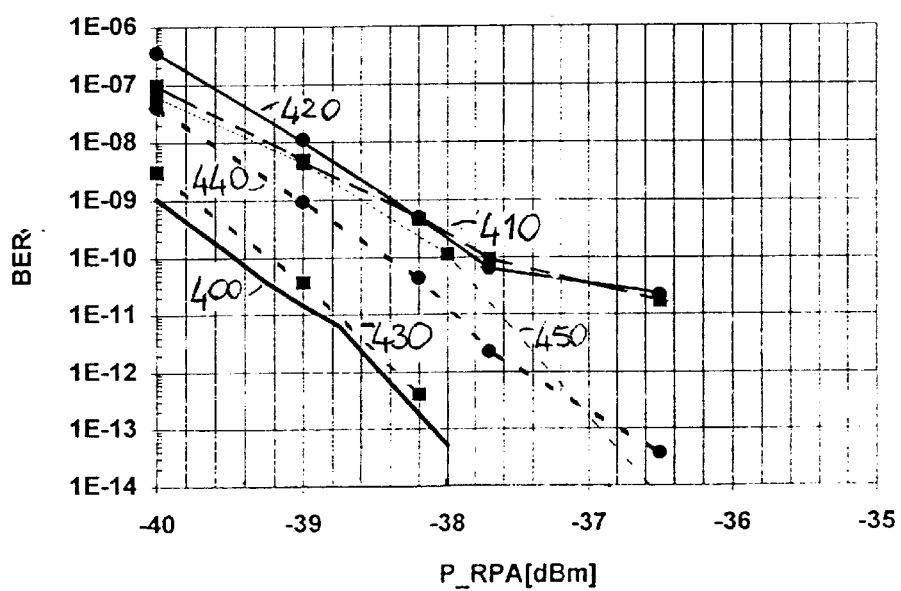
Figure 5:
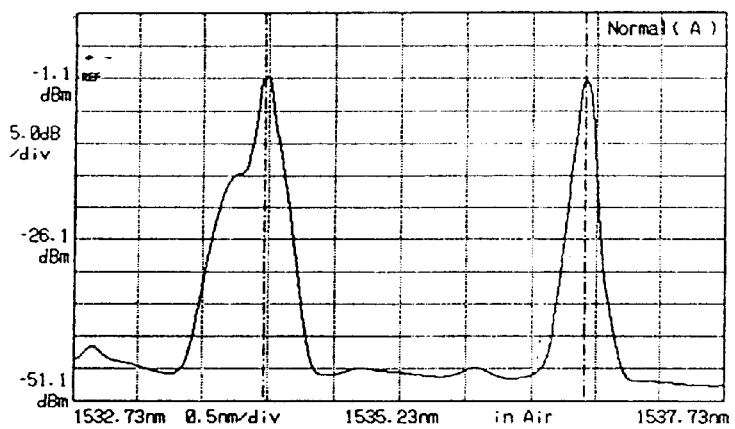
Figure 6:
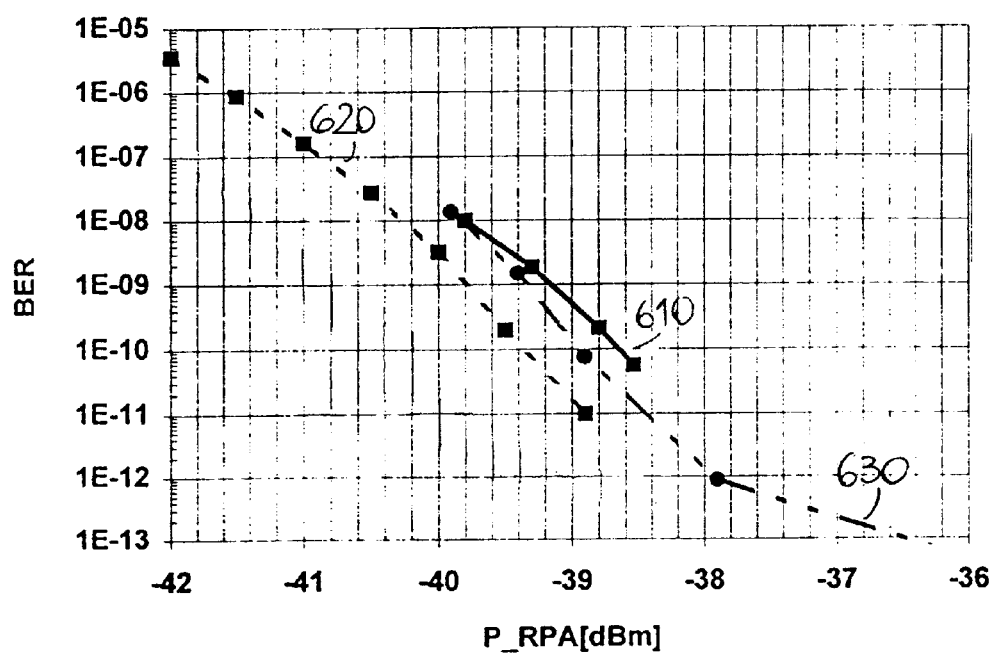

Further information may be obtained from the following description, with reference to the attached drawings, which show:
 in FIG. 1*a*, a diagram of an optical telecommunications system;
 in FIG. 1*b*, a diagram of an optical power amplifier (booster);
 in FIG. 2, a graph of the output power as a function of the wavelength of a power amplifier suitable for use in the present invention;
 in FIG. 3, a graph of the bit error rate as a function of the power at the preamplifier for an optical communication system with variation of the dispersion compensation, in a first experimental trial;
 in FIG. 4, a graph of the bit error rate as a function of the power at the preamplifier for an optical communication system with variation of the signal bandwidth in a first experimental trial;
 in FIGS. 5 and 6, a graph of the bit error rate as a function of the power at the preamplifier for an optical communication system with variation of the signal bandwidth, in a second experimental trial.

With reference to FIG. 1*a*, which is a block diagram of an optical fibre telecommunications system according to the present invention, a transmitting station 104 comprises sources of optical signals capable of emitting corresponding transmission signals. The figure shows two sources 101 and 102, at different wavelengths, and a WDM coupler 103 capable of coupling the said transmission signals into a common optical path. The number of optical signal sources may be different from two, for example greater. The WDM coupler which is used is appropriate for the number of signals and their wavelengths. It is also possible to use a single optical signal source at a single wavelength. In this case, the WDM coupler may be omitted.

In general, the term "WDM coupler" denotes an apparatus or device capable of combining input signals having different wavelengths into a single output fibre, preferably with minimal losses. Examples of such a coupler are interference filters, fused fibre couplers, dichroic mirrors and similar, selected according to the functions required.

The wavelengths of the optical signals generated by the sources preferably lie within the range 1530–1560 nm.

The transmission signals are modulated by corresponding independent signals, for example digital electrical signals at 2.5 Gbit/s, or even at higher frequencies, for example 5 or 10 Gbit/s, or even higher.

The optical signals may be modulated by direct modulation of the lasers 101, 102 or, alternatively by means of optical modulators. Electro-optical modulators of the Mach-Zehnder type, or of the electro-absorption type, for example, may be used within the scope of the present invention.

If the optical signals to be transmitted are generated by sources of signals which have their own transmission characteristics (such as wavelength, bandwidth, type of modulation, power) which are different from those specified for the described link, the transmitting station 104 may comprise interface units, not shown in the figure, capable of receiving the optical signals generated by the sources 101, 102, of detecting them, of regenerating them with new characteristics suitable for the transmission system, and of sending them to the multiplexer 103.

U.S. Pat. No. 5,267,073, in the name of the present applicant, the description of which is incorporated for reference, describes interface units comprising, in particular, a transmission adapter capable of converting an optical signal at the input into a form suitable for the optical transmission line, and a reception adapter, capable of reconverting the transmitted signal into a form suitable for a receiving unit.

For use in the system according to the present invention, the transmission adapter may comprise, as the output signal generating source, a direct modulation or external modulation laser.

The transmission signals generated by the transmitting station 104 are supplied to a power amplifier (booster) 105, which will be described subsequently. This power amplifier preferably has a total optical output power in excess of approximately 18 dBm.

The amplified signals are supplied to the input of an optical fibre line 106, for example one of the DS type.

An optical preamplifier 107 is connected to the end of the optical fibre line 106. A preamplifier suitable for use in the present invention is, for example, the RPA/C-MW type, produced by the applicant.

In the context of the present invention, the term "preamplifier" denotes an amplifier designed to compensate the losses of the final span of optical line, in such a way that the signal entering the receiver has a power level suitable for the sensitivity of the device.

The preamplifier may also conveniently have the function of limiting the dynamic range of the signals, by reducing the variation of the power level of the signals at the receiver input with respect to the variation of the power level of the signals arriving from the transmission line.

The length of the optical fibre line 106 is preferably greater than 100 km. Preferably this line has a length of less than 1000 km, and more preferably it is less than 400 km.

If the available optical power at the output of the power amplifier 105 is insufficient to cover the whole length of the line, optical line amplifiers may be provided along the line. The length of each span between two amplifiers is limited by the power available at the input of the span and by the minimum acceptable signal level at its end. With an optical power per channel of 20 dBm, for example, it is possible to cover a single span with a total attenuation of 58 dB with a guaranteed input power at the preamplifier of −38 dBm per channel, which is considered sufficient to bring the optical signal to a power suitable for an optical receiver, in such a way as to obtain an error rate (BER, or bit error rate) of less than $10^{-12}$.

This total attenuation of 58 dB corresponds to a length of approximately 250 km, allowing for the typical attenuation of optical fibres in the band around 1550 nm (approximately 0.21 dB/km) and the necessary safety margins to take into account the additional losses due, for example, to the ageing of the fibre, the optical connections and the cabling.

The optical signals at the output of the preamplifier 107 are supplied to a dispersion compensator 115 which is capable of imparting a predetermined value of chromatic dispersion to the transmission signals propagating in it. In the following text, for the sake of brevity, chromatic dispersion will be referred to as "dispersion".

This dispersion value of the compensator 115 depends not only on the dispersion of the optical fibre line 106 but also on the operating parameters of the telecommunications system, such as the optical power per channel, the bandwidth of the transmitted channels, and the number of fibre spans between the amplifiers, and is determined experimentally in such a way that the error rate is minimized.

In general, this dispersion value is of opposite sign to the value of the dispersion accumulated along the optical fibre line, but is not equal to it in absolute value.

In one example, in the presence of a line made with DS fibres having a zero dispersion wavelength greater than that of the usable signals, the said dispersion compensator consists of a span of SI fibre, of a suitably selected length. As indicated previously, SI fibres have a positive dispersion per unit of wavelength, of approximately 17–18 ps/(nm km), for signals with wavelengths lying within the band between approximately 1530 nm and approximately 1560 nm.

If the dispersion required by the dispersion compensator 115 is negative, it is also possible to use optical fibres with negative dispersion, of the type described in U.S. Pat. Nos. 5,361,319 or 5,448,674 or in the patent application JP 1-295,207.

Other examples of dispersion compensators are chirped optical fibre Bragg filters, for example those of the type described in the article by F. Ouellette published in Optics Letters, Vol. 12, No. 10, pp. 847–849, in October 1987, or in U.S. Pat. No. 4,953,939.

The optical signals at the output of the dispersion compensator 115 are supplied to a receiving station 108, comprising a WDM demultiplexer 109, of a type suitable for demultiplexing the communication signals, and optical receivers; the figure shows two optical receivers, 110 and 111, for two signals at different wavelengths. The number of receivers and the characteristics of the demultiplexer are selected according to the number of signals at different wavelengths which are to be received; the demultiplexer may be omitted in the case of a communication signal at a single wavelength.

The demultiplexer 109 selects the signals according to the wavelength and sends each signal to a corresponding receiver 110 or 111.

Filters with a suitable bandwidth may be connected, by known methods, between the demultiplexer and the receivers. Additionally, or alternatively, filtering of the individual channels may be carried out by the demultiplexer, or by the input stage of the optical receivers.

FIG. 1b is a block diagram of an optical power amplifier suitable for use in the present invention and described in Patent Application EP97109218 in the name of the present applicant.

This amplifier comprises an input 1 capable of receiving optical signals, connected to an optical isolator 2. The optical signals, generated by a single wavelength source or by one or more multiple-wavelength sources, preferably have a wavelength within the 1530–1560 nm band.

After the optical isolator 2, the signals are applied to the first input of a coupler 6.

A pump signal at a first wavelength, supplied by a pump laser 3, is coupled by means of a coupler 5 to a pump signal at a second wavelength, supplied by a pump laser 4. The wavelength of the pump laser 3 is, for example, between 960 and 980 nm. The wavelength of the pump laser 4 is, for example, between 980 and 1000 nm. The coupler 5 is preferably a WDM coupler.

The two coupled pump signals, at the output of the coupler 5, are supplied to a second input of the coupler 6. The optical signals and the two coupled pump signals, supplied to the first and second input of the coupler 6 respectively, are preferably coupled in a co-propagation mode.

The optical signals at the output of the coupler 6 are supplied to an input of a first optical fibre doped with a rare earth 7.

The optical signals at the output of the optical fibre 7 are supplied to an optical isolator 8 and, subsequently, to an input of a second optical fibre doped with a rare earth 9.

The optical fibres 7 and 9 are preferably silica optical fibres and preferably include erbium as the rare earth dopant. Aluminium, germanium, phosphorus and fluorine, or other dopants capable of favourably affecting the amplification characteristics of the system, may advantageously be used as secondary dopants.

After the optical fibre 9, the optical signals are supplied to the first input of a coupler 13.

A pump signal at a third wavelength, supplied by a pump laser 10, is coupled by means of a coupler 12 to a pump signal at a fourth wavelength, supplied by a pump laser 11. The wavelength of the pump laser 10 is, for example, between 1450 and 1480 nm. The wavelength of the pump laser 11 is, for example, between 1480 and 1500 nm. The coupler 12 is preferably a WDM coupler.

The two coupled pump signals at the output of the coupler 12 are supplied to a second input of the coupler 13. The two coupled pump signals supplied to the second input of the coupler 13 are preferably coupled in a counter-propagation mode with respect to the optical signals supplied to the first input of the coupler 13.

The optical signals at the output of the coupler 13 are preferably supplied to an optical isolator 14 and from there to an output 15.

The optical isolators 2, 8 and 14 limit the effects of optical reflections and back scatter, enabling the amplifier to operate in a stable way.

In particular, the optical isolator 8 located between the two amplifier stages prevents the light from the said second optical fibre doped with a rare earth (particularly the residual pump radiation and the spontaneous counter-propagation emission from the second stage) from being supplied to the said first optical fibre doped with a rare earth.

Additionally, owing to its high attenuation in the first pump waveband between 960 and 1000 nm, the optical isolator 8 prevents the residual pump light from the first stage from reaching the second optical fibre doped with a rare earth. In this way, the pump signals are isolated from each other and each is coupled to a corresponding amplifier or amplifier stage, so that phenomena of reciprocal action are substantially prevented.

The two couplers 5 and 12 are selected in such a way that they enable the emission wavelengths of the two pump lasers 3, 4 and 10, 11 respectively to be coupled.

In particular, the emission wavelength of each pair of pump lasers 3, 4 and 10, 11 must be slightly shifted with respect to the optimal pump wavelength (980 nm and 1480 nm). This shift must be sufficiently large to avoid interference and crosstalk between the pumps caused by the couplers 5 and 12, and the consequent power losses.

However, this shift is limited by the extent of the pump band, in such a way as to ensure a high pump efficiency in the active fibre.

An amplifier stage comprises a pump system comprising at least one pump source, which supplies a pump signal, a coupler capable of combining the pump signal with an optical signal, and a doped optical fibre to which the combined signals are coupled.

A power amplifier comprises two amplifier stages interconnected by means of an optical isolator 8. It preferably comprises an optical isolator 14 at the output of the second stage. It preferably comprises an optical isolator 2 at the input of the first stage.

With reference to the block diagram in FIG. 1b, an example of an amplifier 105 constructed by the applicant will now be described.

A coupler 6 suitable for this invention is a WDM coupler operating at a wavelength of 980/1550 nm, model SWDMCPRAPSA10, marketed by E-TEK.

The pump laser 3 is a laser module with stabilized wavelength (laser with Bragg networks in fibre) operating at a wavelength of approximately 975 nm, marketed by the SDL company, model SDLO-2100-CN. This pump laser 3 has a very narrow emission band of approximately 3 nm, owing to the in-fibre networks located in the output fibre connected to the laser.

The pump laser 4 is a laser module with stabilized wavelength (laser with Bragg networks in fibre) operating at a wavelength of approximately 986 nm, marketed by the SDL company, model SDLO-2100-CJ. This pump laser 4 has a very narrow emission band of approximately 3 nm, owing to the in-fibre networks located in the output fibre connected to the laser.

By using pump lasers which make use of in-fibre networks, it is possible to reduce the amount of deviation of the two emission wavelengths of the two coupled pump lasers, as a result of the narrow emission band of each pump laser.

By using a pump laser with a narrow emission band, it is possible to increase pump efficiency, so that the two wavelengths can be very close to each other, being separated by a few nanometers, without any risk of interference between the pump lasers.

Furthermore, the closeness of the pump laser wavelengths to the region of greater efficiency reduces the noise figure of the amplifier. This is due to the reduction of spontaneous emission by the excited bands.

The coupler 5 is a WDM coupler operating at a wavelength of 970/990 nm, marketed by JDS, model WD0909.

The optical fibres 7 and 9 are produced by the applicant.

In the example, the fibres 7 and 9 are silica fibres with the following core composition, expressed with respect to the silica:

$Er_2O_3$=600 ppm, $Al_2O_3$=0.5% mol, $GeO_2$=7% mol.

These fibres have a numerical aperture of 0.195 and a cut-off wavelength of between 900 and 980 nm. The length of the fibres is approximately 13 m for fibre 7 and 19 m for fibre 9.

The pump laser 10 is a laser of the Fabry Perot type with a central emission wavelength of approximately 1460 nm, marketed by FURUKAWA, model FOL1402PAZ-P1. A laser module with in-fibre network marketed by SUMITOMO, model SLA5620-XA/PR1, may also be advantageously used.

The pump laser 11 is a laser of the Fabry Perot type with a central emission wavelength of approximately 1485 nm, marketed by FURUKAWA, model FOL1402PAZ-P2. A laser module with in-fibre network marketed by SUMITOMO, model SLA5620-XB/PR1, may also be advantageously used.

The coupler 12 is a WDM coupler operating at 1460/1550 nm, marketed by JDS, model WD1414A-A30.

The coupler 13 is a WDM coupler operating at 1475/1550 nm, marketed by JDS, model WD1415A-A30.

The isolators 2, 8, 14 are marketed by E-TEK, model PIF12PR344100.

A signal at a wavelength within the range 1530–1560 nm is supplied to the input 1 of the amplifier 105.

The pump lasers 3 and 4, both supplied with a current of approximately 200 mA, provide an output optical power of approximately 120 mW each. A power of approximately 220 mW is available at the output of the coupler 5.

The pump lasers 10 and 11, both supplied with a current of approximately 650 mA, provide an output optical power of approximately 160 mW each. A power of approximately 280 mW is available at the output of the coupler 12.

FIG. 2 shows the output power of the amplifier 105 as a function of the wavelength of the input signal from 1535 nm to 1560 nm. With an input power of +2 dBm, an output power of between 23.2 and 23.6 dBm is obtained.

An example of an embodiment of an optical communication system of the type described with reference to FIG. 1a will now be described.

In this example, two optical signal sources 101, 102, made by QUANTE, are used, and comprise direct modulation lasers operating at 2.5 Gbit/s, for wavelengths within the range 1530–1540 nm, for example approximately 1535 nm and approximately 1537 nm.

The transmission band obtained in this way for the two channels is equivalent to that of a single 5 Gbit/s channel.

By modifying the modulation index of the signals it is possible to vary the bandwidth of the optical signals emitted, for example over a range of approximately 0.3–1.0 nm.

The total output power of the power amplifier 105 is between approximately 22 and 23 dBm (corresponding to a power per channel between approximately 19 and 20 dBm), for example approximately 22.5 dBm (corresponding to a power per channel of approximately 19.5 dBm).

The length of the optical fibre 106 is between 200 and 250 km.

In the example, DS fibres are used, with an average zero dispersion wavelength $\lambda_o$ greater than 1540 nm, for example approximately 1555 nm.

The mean dispersion at the signal wavelengths is therefore negative. For example, the total value of dispersion along the optical fibre line 106 is approximately −350 ps/nm.

The dispersion compensator is made from an SI fibre span, with a length of between approximately 20 and 40 km, and preferably between approximately 20 and 30 km.

In the example, the dispersion imparted by the dispersion compensator 115 is approximately between +300 ps/nm and +700 ps/nm.

The optical receivers 110, 111 are receivers meeting the SDH, or SONET, specifications for a modulation rate of 2.5 Gbit/s.

In a first experiment, only one of the two signal sources was activated, at the nominal wavelength of 1535 nm, the other source being cut off. The bandwidth of the optical signal, measured at −20 dB from the peak, was 0.36 nm. In these conditions the optical power available at the output of the power amplifier was used for a single channel, and was approximately 22.6 dBm.

The length of the fibre used in the line 106 was 240 km. A 13 dB fixed attenuator and a variable attenuator were connected between the line 106 and the preamplifier 107, respectively to simulate the additional line losses due to ageing, the optical connections, the wiring, etc., and to enable the power at the preamplifier input to be varied.

In the course of the experiment, the receiver was replaced with a spectrum analyser to measure the spectral characteristics of the signal, and subsequently with a bit error rate (BER) measuring device.

The amount of dispersion of the compensator 115 was varied, by using spans of SI fibre with lengths varying between 0 and 50 km, in steps of 10 km, and in each case the BER at the receiver as a function of the power at the input of the preamplifier 107 was measured. The power at the input of the preamplifier was measured by connecting an optical divider before the preamplifier.

The results of the experiment are shown in FIG. 3.

The curve 390 relates to a preliminary test in which the transmitter and the receiver were connected to each other by means of a 20 km span of SI fibre, in the absence of the optical line 106. The low error rate and the regular slope of the BER curve show that there were no distortions due to the transmitter, the receiver or the span of SI fibre.

The remaining curves relate to measurements made on the system, as described previously. The curve 300 corresponds to the absence of dispersion compensation (0 km of SI fibre); it has high error rates and also has a floor for the power at the input of the preamplifier in excess of −39 dBm. Behaviour of this type, which is a sign of signal distortion, is particularly unfavourable in that it does not allow the error rate to be reduced by increasing the power at the receiver.

The curve 310 corresponds to the case of dispersion compensation by means of an SI fibre with a length of 10 km, with a dispersion of approximately 170–180 ps/nm. In this case, the dispersion of the optical fibre line 106 is under-compensated by approximately 170–180 ps/nm. It will be observed that, despite a certain improvement, the BER does not fall below $10^{-10}$ even with a power of −37 dBm at the preamplifier.

The best results were obtained with an SI fibre length of 20 and 30 km, corresponding to a dispersion of the dispersion compensator of 340–360 ps/nm and 510–540 ps/nm respectively. In the first case (curve 320) the dispersion of the optical fibre line 106 was approximately compensated, and in the second case it was over-compensated by approximately 160–190 ps/nm. A BER equal to or less than $10^{-12}$ can be achieved in both cases.

It will be observed that the straight portion of the curve 320 between the values of power at the preamplifier of −39 and −34 dBm is plotted by interpolation from the available experimental data. The applicant considers that the actual values of BER in this portion may be even lower than those shown in the figure.

The curve 340 (40 km of SI fibre, with a dispersion of approximately 680–720 ps/nm) shows a worsening of the BER with respect to the preceding case.

The curve 350 (50 km of SI fibre, with a dispersion of approximately 850–900 ps/nm) shows a further worsening of the BER.

On the basis of the illustrated experimental data, the applicant has established, in the case under examination, that the optimal length of SI fibre was between approximately 20 and 30 km, and preferably approximately 20 km.

An experiment similar to that described may be carried out by a person skilled in the art to identify the optical value of dispersion compensation for the particular communication system under examination, which may vary, in particular, as a function of the optical power per channel, the bandwidth and the wavelength of the optical signals, and the number of optical amplifiers present along the line.

In a second experiment, the bandwidth of the optical signal emitted by the transmitter was modified between the values of approximately 0.32 and approximately 0.48 nm, by varying the modulation index of the semiconductor laser.

In this experiment, the output power of the power amplifier was approximately 21.5 dBm. However, one set of measurements, combined in the curve 450, was made with an output power of the power amplifier of approximately 22.6 dBm.

Where not otherwise indicated, the optical system and the experimental conditions of the second experiment were the same as those of the first experiment.

In this case also, the BER was measured, with the variation of certain parameters, as a function of the power at the input of the preamplifier.

The curve 400 is a reference curve, and relates to the case of a direct (back-to-back) connection between the transmitter and receiver, with a signal bandwidth of approximately 0.48 nm. The error rate is low in this case, and there are no floors to indicate signal distortion.

The curves 410 and 420 were obtained in the absence of the dispersion compensation fibre, with signal bandwidths of approximately 0.48 nm and 0.32 nm respectively.

In both cases, the results were not considered satisfactory, owing to the high error rate and the presence of a floor with powers at the receiver in excess of −38 dBm.

The curves 430, 440 and 450, however, were obtained in the presence of a 20 km span of SI fibre, with a dispersion of approximately 340–360 ps/nm at the output of the preamplifier 106.

The curve 430 corresponds to a signal width of approximately 0.48 nm.

The curve 440 corresponds to a signal width of approximately 0.32 nm.

The curve 450 corresponds to a signal width of approximately 0.48 nm and a power at the output of the power amplifier 105 of approximately 22.6 dBm.

It can be seen that, in the presence of a dispersion compensator, optimized as indicated in the preceding experiment, the signal reaches the receiver without significant distortion, as indicated by the absence of floors in curves 430–450.

It can also be seen that the error rate has lower values for a greater bandwidth, and for a smaller power at the output of the power amplifier.

In the course of a third experiment, a second optical source operating at the wavelength of approximately 1537 nm was connected to the line, according to the procedure indicated previously.

The spectrum of the signal at the output of the WDM coupler 103 is shown in FIG. 5. The wavelength values shown at the ends of the horizontal scale are only approximate. The bandwidth of the source at 1535 nm at −20 dB from the peak is approximately 0.48 nm.

A 20 km span of SI fibre was connected to the output of the preamplifier 107. An optical band-pass filter, centred on the wavelength of 1535 nm and with a bandwidth of 1 nm was connected to the output of the SI fibre. The output of the filter was connected to a BER measuring device.

FIG. 6 shows the measurements of the error rate for the channel at 1535 nm measured with a variation of optical power per channel at the input of the preamplifier.

The preamplifier used in this case was the RPA/MW model produced by the applicant.

The curves 610 and 620 relate to the case in which the laser operating at 1537 was switched off, and the radiation of the laser operating at 1535 nm was amplified by the amplifier 105 to an output power of 23 dBm (curve 610) and 20 dBm (curve 620) respectively.

The laser operating at the nominal wavelength of 1537 nm was then switched on, and the BER measurements were repeated (curve 630) with both the optical sources in operation and with a total optical power at the output of the amplifier 105 of approximately 23 dBm, corresponding to approximately 20 dBm per channel. The results of the experiment indicate that it is possible to obtain fairly low error rates, without distortion, even in the presence of a number of communication signals at different wavelengths.

What is claimed is:

1. An optical telecommunications system comprising:
   a transmitting station for emitting an optical signal having a power of between 18 and 30 dBm;
   an optical fibre transmission line for transmitting the said optical signal, comprising a dispersion shifted fibre with a length of between 100 km and 1000 km;
   an optical receiving station, for receiving the said optical signal; and
   a chromatic dispersion compensator positioned between the said transmission line and the said optical receiving station, for imparting a predetermined chromatic dispersion to the said optical signal.

2. An optical telecommunications system according to claim 1, wherein the said transmission line has a length of between 200 and 400 km.

3. An optical telecommunications system according to claim 1, wherein the said signal has a power of between 19 and 23 dBm.

4. An optical telecommunications system according to claim 1, wherein the said signal has a bandwidth of between 0.3 and 1.5 nm.

5. An optical telecommunications system according to claim 4, wherein the said signal has a bandwidth of between 0.3 and 1.0 nm.

6. An optical telecommunications system according to claim 5, wherein the said signal has a bandwidth of between 0.3 and 0.6 nm.

7. An optical telecommunications system according to claim 1, wherein the said optical signal defines a first optical signal and the said transmitting station comprises a first source for emitting said first optical signal and a second source for emitting a second optical signal at a wavelength different from the wavelength of the said first optical signal, the said second optical signal having a power of between 18 and 30 dBm.

8. An optical telecommunications system according to claim 1, wherein the said transmission line comprises an optical amplifier.

9. An optical telecommunications system according to claim 8, wherein the said optical amplifier is an erbium-doped fibre amplifier.

10. An optical telecommunications system according to claim 1, wherein the said signal has a wavelength in the 1530–1560 nm band.

11. An optical telecommunications system according to claim 1, wherein the said dispersion compensator has a dispersion of opposite sign to and not less than the dispersion of the said optical fibre span.

12. An optical telecommunications system according to claim 1, wherein the said transmitting station comprises a direct modulation laser source.

13. An optical telecommunications system according to claim 1, wherein the said transmitting station comprises an optical power amplifier.

14. A method of transmitting optical signals, comprising generating an optical signal having a power of between 18 and 30 dBm;

transmitting the said optical signal along a span of dispersion shifted optical fibre with a length of between 100 and 1000 km, causing in the said signal a chromatic dispersion of less than 1500 ps/nm as a result of the said transmission in the said span;

amplifying the said signal;

compensating the said chromatic dispersion of the said signal; and receiving the said signal.

15. A method of transmitting optical signals according to claim 14, wherein the said stage of compensating the chromatic dispersion comprises applying to the said signal a chromatic dispersion of opposite value to, and greater in absolute value than, the said chromatic dispersion to which the said signal is subject.

16. An optical telecommunication system according to claim 1, comprising a single chromatic dispersion compensator defined by said chromatic dispersion compensator positioned between the said transmission line and the said optical receiving station.

17. An optical telecommunication system according to claim 1, wherein said optical fibre transmission line comprises a single span of dispersion shifted fibre.

* * * * *